Patented Oct. 5, 1954

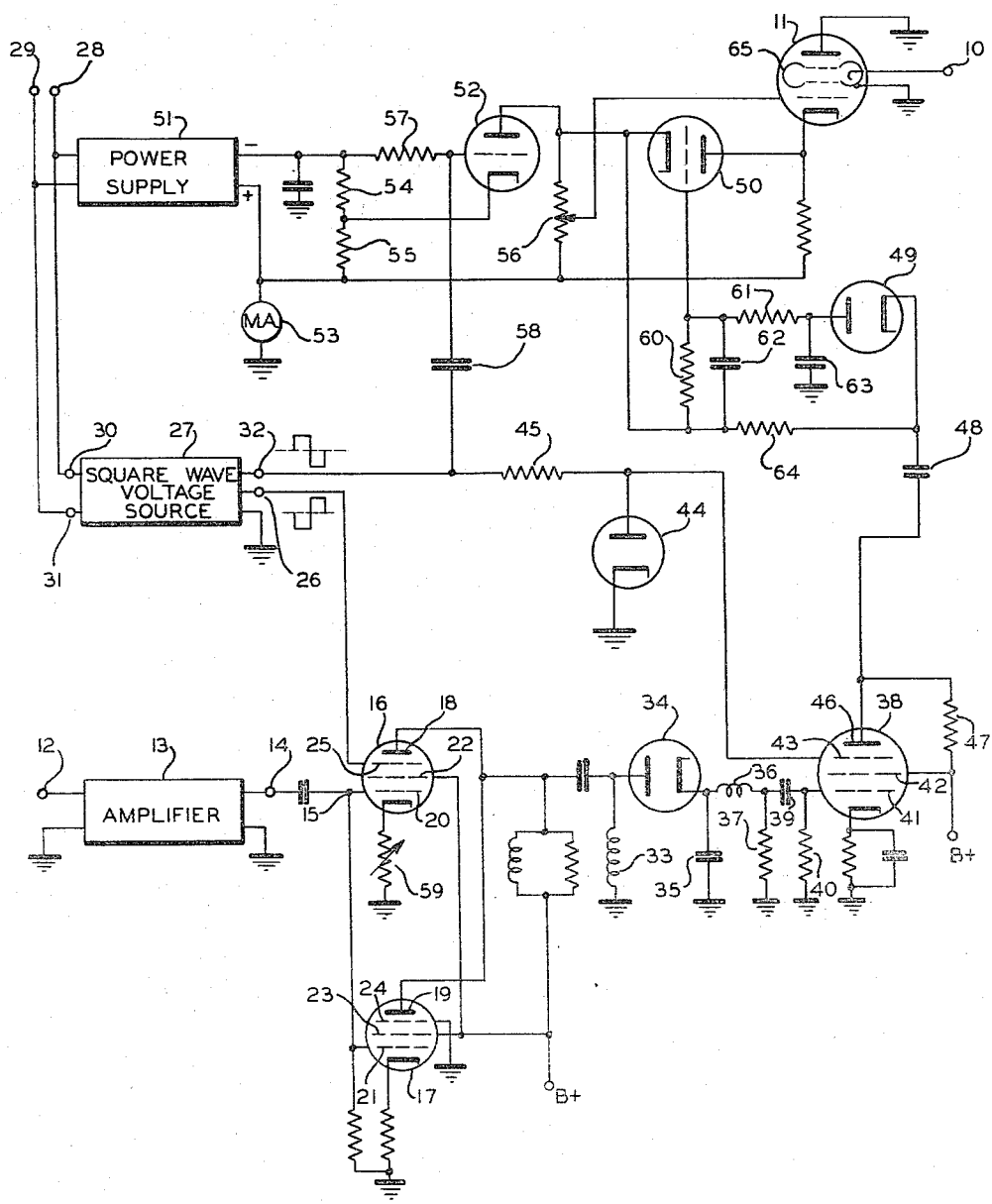

2,691,098

UNITED STATES PATENT OFFICE 2,691,098

AUTOMATIC NOISE FIGURE METER

Walter Selove, Cambridge, Mass., assignor, by mesne assignments, to the United States of America as represented by the Secretary of the Navy Application December 14, 1945, Serial No. 635,093

11 Claims. (Cl. 250—20)

This invention relates to electronic measuring devices and more particularly to devices for automatically yielding a noise figure, indicating merit and performance of radio receivers, receiving system or amplifiers.

At the present state of the electronic art there have been numerous methods and systems set forth which purport to yield information concerning usable sensitivity, noise figure, or figure of merit in radio receivers, receiving systems or amplifiers. The system which at present appears to be most frequently used is the so-called sensitivity measurement system, whereby a given signal voltage is introduced into the receiver, receiving system or amplifier under specified conditions. Relating to noise output in the receiver, the sensitivity measurement is finally and specifically evaluated in terms of voltage applied to the input of said receiver, receiving system or amplifier.

One definition of sensitivity of receivers is herewith included as an example, in order to clarify the meaning of the word sensitivity as it is sometimes used. The sensitivity of a receiver is the number of microvolts from a standard signal generator being modulated thirty per cent at one thousand cycles per second, applied to the input of the receiver, and introduced thereto by means of a standard dummy antenna placed between the signal generator and receiver, which will cause six milliwatts of power to be delivered from the output of the receiver, the amplification controls of the receiver having been set in such manner that sixty microwatts or less of power is delivered from the receiver as the result of noise alone.

Another and more recent development purporting to yield more specific information concerning the ultimate merit of receivers, receiving systems, or amplifiers than the previously mentioned method, specifies the merit of the receiving or amplifying devices in terms of a ratio or figure predicated in terms of noisiness rather than gain or amplification of the systems since gain or amplication does not impose inherent limitation upon the usefulness of the receivers, receiving systems or amplifiers.

One definition of noise figure, sometimes called figure of merit, of receivers is herein included, and is intended to serve as an example for clarification of the expression noise figure as it is sometimes used in connection with receivers, receiving devices, or amplifiers.

Noise figure is mathematically defined as the ratio of the equivalent input noise power of a receiver to the component of input noise power from the antenna radiation resistance.

The equivalent input noise power of a receiver may be defined as being an amount of noise power which, if applied at the receiver input, would yield the actual noise at the output of the receiver with no other noise sources present. The component of input noise power from the antenna radiation resistance may be computed from an expression derived from the expression for thermal agitation voltage which includes bandwidth, temperature in degrees Kelvin, and Boltzman's constant.

Noise figure may be thus further explained as that figure which makes a comparison between the total noise power present and the component of noise power associated with the antenna radiation resistance, since this represents a source of noise common to all receivers and one that cannot be eliminated.

Heretofore in performing the actual measurement of receiver performance using either of the above mentioned methods and systems or any similar system, considerable time, trouble and effort was necessarily expended in reading meters, making physical and electrical connections, or manual switching, in order to take data under differing conditions for later mathematical operation. Furthermore the measurement of receiver performance by either of the above mentioned methods and systems or any similar system, results in data which is necessarily static in nature. Also any readjustment in the equipment necessitates a complete remeasurement subsequent to such readjustment in order to evaluate the result of such readjustment.

The general object of the present invention is to overcome the foregoing difficulties by providing a device which will yield a noise figure or figure of merit relating to any receiver, receiving system or amplifier.

Another object of the present invention is to provide a device which will yield a noise figure or figure of merit relating to any receiver, receiving system or amplifier and which will yield said information automatically and without the use of manual switching to alter conditions of, or connections to, the receivers, receiving circuits, or amplifiers which are being measured.

A further object of the present invention is to provide a device which yields a noise figure or figure of merit relating to any receiver, receiving system or amplifier and which yields said information automatically and continuously while the receiver, receiving system or amplifier is being measured, notwithstanding the fact that alteration or adjustment of the receiver, receiving system or amplifier may occur during the time said information is being presented.

A further object of the present invention is to provide a device which automatically yields a noise figure or figure of merit relating to any complete receiver, receiving system, or amplifier, or any portion thereof.

A further object of the present invention is to provide a device which automatically yields a noise figure or figure of merit relating to any receiver, receiving system or amplifier and which yields the information under dynamic conditions of both receiver and measuring device.

A further object of the present invention is to provide a device which yields information concerning noise figure or figure of merit immediately and continuously, enabling continuous evaluation of the relative results of any adjustment operation such as tuning the receiver, receiving system or amplifier may cause.

A further object of the present invention is to provide a device which automatically yields a noise figure or figure of merit relating to any receiver, receiving system, or amplifier and which yields the figure directly, and without resort to any mathematical manipulation involving the data presented by the device.

These and other objects will be apparent from the following specification when taken with the accompanying drawing which illustrates generally a circuit diagram of an embodiment of the invention.

In the accompanying drawing the radio receiver is connected between the output terminal 10 of a noise generator 11 and the input terminal 12 of a linear amplifier 13. The noise generator 11 in the accompanying diagram is a Klystron or similar velocity modulated electron tube whose noise power output is directly proportional to its cathode current. The above mentioned linear amplifier 13 may be an audio, video, or radio frequency amplifier, the selection depending on the type of receiving device being measured.

The output at 14 of amplifier 13 is introduced into the input 15 of another amplifier composed of electron tubes 16 and 17 and their associated circuit components. This amplifier comprises one stage of amplification by the electron tubes 16 and 17, the electron tubes having their plates 18 and 19 connected in parallel, their control or number one grids 20 and 21 also connected in parallel, and their screen or number two grids 22 and 23 likewise connected in parallel. The suppressor or number three grid 24 of electron tube 17 is connected to ground. The suppressor or number three grid 25 of electron tube 16 is connected to one output terminal 26 of a source of square wave voltage 27, the square wave voltage being of correct order of magnitude to cut on and cut off the electron tube 16.

The amplifier comprising electron tubes 16 and 17 provides amplification of the output of amplifier 13 with the additional function that the output of the amplifier comprising electron tubes 16 and 17 is attenuated three decibels, when tube 16 is not conducting. This attenuation results because the transconductance of the effective electron tube of the amplifier is reduced when electron tube 16 does not conduct, the transconductance of electron tube 16 being adjustable by variable cathode resistor 59.

The square wave voltage source 27 comprises wave shaping circuits of the type commonly encountered in devices suitable for squaring sine waves. The particular square wave voltage source shown uses any generally available alternating line voltage supply introduced at terminals 28 and 29 as its sine wave input 30 and 31, although any other convenient source of sine waves may be used. The square wave output from the square wave voltage source 27 appears with respect to ground at terminals 26 and 32, the voltages at these points being exactly out of phase. The square wave voltage occurring between terminal 32 and ground causes the previously mentioned noise generator 11 to turn on or off. The square wave voltage occurring between terminal 26 and ground causes electron tube 16 to conduct or cut off. Because the voltages at terminals 32 and 26 are exactly out of phase, the noise generator 11 turns on during the half cycle in which electron tube 16 is not conducting, hence the amplifier stage including electron tubes 16 and 17 has three decibels attenuation whenever the receiver's output depends on noise introduced into it from noise generator 11. Subsequently during the half cycle in which noise generator 11 turns off, electron tube 16 conduits, and the three decibel attenuation is removed from the parallel tube amplifier which includes electron tubes 16 and 17.

The output of the amplifier of which electron tubes 16 and 17 are a part, includes components of noise comprising random frequency voltages modulated at the frequency of the square wave source 27 provided the output of the amplifier, when the noise generator is "on" and the tube 16 is nonconducting, is unequal to the output of the amplifier when the noise generator is "off" and the tube 16 is conducting.

Voltages appearing across inductor 33 are rectified by diode 34 which is connected to a configuration of circuit elements comprising capacitor 35, inductor 36, and resistor 37, the above mentioned elements with the diode comprising a half-wave peak rectifier for voltages occurring across inductor 33. Capacitor 35, inductor 36, and distributed circuit capacitance in parallel with resistor 37 comprise a low-pass pi-section filter circuit which attenuates any voltage components across resistor 37 except direct voltages or voltages near or below the frequency of the alternating line voltage supply.

Voltages occurring across resistor 37 are introduced into the grid circuit of electron tube 38 by means of capacitor 39 and resistor 40 which comprise a resistor-capacitor coupling network, thereby placing on the control grid 41 of electron tube 38 fluctuating components of the voltage appearing across resistor 37. The screen grid 42 of electron tube 38 is connected to a suitable positive direct voltage source. The suppressor grid or number three grid 43 of electron tube 38 is connected to the plate of diode 44 which in turn is connected to terminal 32 of the square wave voltage source by way of resistor 45. Diode 44 and resistor 45 comprise a circuit which allows only the negative portion of the square wave at terminal 32 to appear at either the plate of diode 44 or the suppressor or number three grid of electron tube 38.

Changes in plate current of electron tube 38 result in changes in voltage at plate 46 as a result of voltage changes across resistor 47 placed between plate 46 and a suitable supply of positive voltage, the changes in plate voltage being coupled through capacitor 48 into the cathode of diode 49, where they are rectified and filtered and result in a direct voltage grid bias which varies the direct current plate resistance of electron tube 50. The direct current plate resistance of electron tube 50 is placed in series with the noise generator cathode. Hence, the cathode current of noise generator 11 varies inversely with the magnitude of said plate resistance, said plate resistance controlling the bias on noise generator 11.

In the accompanying drawing the alternating line voltage supply introduced at terminals 28 and 29 connects to a power supply 51 furnishing suitable voltage with the polarities indicated for operating electron tubes 50, 52 and noise generator 11. Electron tubes 50 and 52 are connected to the power supply so that any current drawn by these tubes will not be indicated on milliammeter 53. Noise generator 11 however is connected to the power supply so that its average cathode current is indicated on milliammeter 53 which is calibrated against known noise power to read noise figure.

The cathode of electron tube 52 is connected to power supply 51 at the junction of a voltage divider comprising resistors 54 and 55, these resistors being of such value that the voltage drop across resistor 54 will exceed cut-off value for electron tube 52. The plate of electron tube 52 is attached to the positive terminal of power supply 51 through resistor 56. Resistor 57 connects the negative terminal of power supply 51 to the grid of electron tube 52, thereby applying the voltage drop across resistor 54 at said grid to bias tube 52 to nonconduction when no other voltages are being applied to said grid.

Terminal 32 of square wave voltage source 27 is connected to the grid of electron tube 52 by capacitor 58. Hence the square wave voltage at terminal 32 causes electron tube 52 to conduct on positive excursions of the square wave and to cut off on negative excursions of the wave, which in turn causes alternately negative or zero voltage at the plate of said tube with respect to the positive terminal of power supply 51. Electron tube 52 functions as an electronic switch controlling the operation of noise generator 11, said switch being in turn actuated by the aforementioned square wave voltage source.

As previously stated in this specification the direct current plate resistance of electron tube 50 serves as a variable resistance in series with the cathode of noise generator 11, the complete series of connections being that as traced from the positive terminal of power supply 51, through meter 53, to ground, to the reflector element and resonant cavity 65 of noise generator 11, through the electron stream of the generator to the cathode of the generator, through the direct current plate resistance of electron tube 50, to the plate of electron tube 52, through the electron stream of electron tube 52 to the cathode of the tube, through resistor 54, and finally to the negative terminal of power supply 51. Hence when electron tube 52 is cut off, no current flows in the above-mentioned series, and when electron tube 52 conducts, current flows in the above mentioned series, this current being limited by the total resistance in the series and more specifically limited by the direct current plate resistance of electron tube 50 and the bias on the control grid of noise generator 11. Resistor 56 includes a variable connection which is a manual control for preliminary adjustment of the operating bias on the grid of noise generator 11 when electron tube 52 is conducting.

The network composed of resistors 60 and 61 and capacitors 62 and 63 comprises a load and filter circuit for diode 49. Voltage appearing across resistor 60 acts as bias for the grid of electron tube 50 which causes its direct current plate resistance to vary. Because all elements of electron tube 50 vary abruptly in voltage with respect to ground during alternate periods of the square wave appearing at terminal 32, the plate of diode 49 connects to the grid of electron tube 50 through resistor 61, and the cathode of diode 49 connects to the cathode of electron tube 50 through resistor 64, hence preventing the operation of electron tube from affecting that of diode 49.

The automatic feature of the present invention may be clarified by an example showing how the present invention is used. The radio receiver being measured is placed between terminals 10 and 12. Noise is introduced into the radio receiver by noise generator 11 on positive half periods of the square wave appearing at terminal 32, and only the receiver's inherent noise appears at its input terminals during the negative half periods of said wave. If noise generator 11 introduces noise equivalent to the inherent input noise of said radio receiver, no voltage component at the square wave frequency appears at grid 41. Hence any alternating voltage at plate 46 results only from voltage appearing at grid 43. Thus one value of negative bias controlling the noise generator's output occurs at the grid of electron tube 50 and a figure indication appears on meter 53.

If noise generator 11 introduces more noise than that inherent in the input of the radio receiver, a component of the square wave at terminal 26 appears at grid 41, the component being in phase with the voltage appearing at grid 43, hence causing greater alternating voltage at plate 46 and causing greater negative bias to develop at the grid of electron tube 50, causing noise generator 11 to deliver less power until approximate balance occurs between inherent receiver noise and noise generator output. Hence a lower figure appears on meter 53.

If noise generator 11 introduces less noise than that inherent in the input of the radio receiver a component of the square wave at 26 appears to grid 41, the component being out of phase with the voltage appearing at grid 43, hence causing less alternating voltage at plate 46 and causing less negative bias to develop at the grid of electron tube 50, causing noise generator 11 to deliver more power until approximate balance occurs between inherent receiver noise and noise generator output. Hence a larger figure appears on meter 33.

Because, as has been shown in the preceding paragraphs, the present invention compensates automatically for any differences in the inherent input noise of a radio receiver and noise from a noise generator three decibels above said inherent input receiver noise, the invention provides the advantage of continuously adjusting itself for noise figure measurement, notwithstanding concurrent adjustment or change in the input circuits of the radio receiver, or change in amplification of the radio receiver, and the advantage of elimination of manual operation of switches or attenuators.

The present invention need not be limited to the details shown, which are illustrative of one form the invention may take.

What is claimed is:

1. An automatic device for measuring noise figure or figure of merit indicating merit of performance of an electronic apparatus comprising, a noise generator for introducing power into the input of said apparatus to be tested, a meter connected to the output of said noise generator to indicate the amplitude thereof, a square wave voltage source, an electronic switch for making said generator operative or inoperative on alternating periods of the voltage from said square wave source, electronic control means responsive to input voltage to adjust the output of said noise generator, a first electronic amplifier responsive to the output of said apparatus to be tested, a second amplifier responsive to said first amplifier output, means to attenuate the output of said second amplifier three decibels during the period of the aforementioned square wave when said noise generator is operative, a detecting device connected to said second amplifier and responsive to modulation components of said square wave voltage in the output of said second amplifier, a third electronic amplifier responsive to the phase and magnitude of the output of said detecting device compared to a reference voltage from said square wave source, and means for applying the output of said third amplifier to said control means, thereby causing said noise generator to furnish noise power to the input of said apparatus to provide an output level of said second amplifier substantially equal to that obtained from the inherent noise output of said apparatus, and indicating said substantial equality on said meter in terms of noise figure or figure of merit of said radio receiver, receiving system or amplifier.

2. An automatic device for measuring noise figure or figure of merit relating to electronic apparatus included in radio receivers, receiving systems, or amplifiers comprising, an electron tube noise generator, a meter connected to indicate cathode current of said noise generator, means for feeding a signal from said generator to said apparatus, a source of square wave alternating voltage having two output terminals differing in phase by one hundred and eighty degrees, an electronic switch connected to one terminal of said square wave source, said switch alternately making said noise generator operative or inoperative, a variable electronic attenuator connected to said noise generator, a first amplifier having an input circuit responsive to the output of said radio receivers, receiving systems, or amplifiers whose noise figure is being measured, a second amplifier whose gain varies three decibels as the result of an applied controlling voltage from the other terminal of the previously mentioned square wave voltage source, a rectifier connected to detect modulation components having the frequency of the square wave voltage source in the output of said second amplifier, and a third amplifier whose output depends on the phase relationship of the output of said rectifier and a reference voltage supplied to said third amplifier from the square wave voltage source, the output of said third amplifier being applied to control said previously mentioned variable electronic attenuator thereby causing said noise generator to furnish noise power to said radio receivers, receiving systems, or amplifiers, substantially equal to that inherent in the output thereof, and indicating said substantial equality on the aforementioned meter in terms of noise figure or figure of merit of said radio receivers, receiving systems or amplifiers.

3. An automatic electronic device for measuring noise figure or figure of merit indicating excellence of performance of the whole or any part or section of a radio receiver, receiving system, or amplifier, said device comprising in combination, electronic noise generator, means for feeding a signal from said generator to the input of the whole or any part or section of said radio receiver, receiving system or amplifier, a meter for indicating the cathode current of said noise generator, said noise generator having been calibrated with said meter and known values of noise power, a source of square wave alternating voltage, an electronic switch operating said noise generator, said switch being in turn operated by said source of square wave alternating voltage, a first amplifier, means for connecting the input of said first amplifier to the output of the whole or any part or section of said radio receiver, receiving system or amplifier, a second amplifier responsive to said first amplifier and having a gain which varies three decibels as controlled by aforesaid source of square wave alternating voltage, a rectifier connected to detect modulation components having the frequency of the aforesaid square wave voltage source which are contained in the output of said second amplifier, a third amplifier the output of which varies depending on the magnitude of the output voltage from said rectifier and the phase of said output voltage with respect to the phase of a reference voltage introduced into said third amplifier from aforesaid square wave alternating voltage source, a second rectifier connected to convert to direct voltage the output of said third amplifier, a variable electronic attenuator the resistance of which is controlled by the output of said second rectifier, said variable electronic attenuator being connected to said generator for automatically controlling the noise power output of the aforementioned noise generator as a result of the relationship between the noise power output of said noise generator and the inherent noise power at the output of the whole or any part or section of said radio receiver, receiving system, or amplifier, indicating said relationship directly on the aforementioned meter as noise figure or figure of merit of the whole or any part or section of said receiver, receiving system or amplifier.

4. An automatic electronic device for measuring noise figure or figure of merit indicating excellence of performance of the radio frequency portion of a radio receiver, said device comprising in combination, a noise generator having an electron tube of the velocity modulated type, means for applying the output of said generator to the input of the radio frequency portion of said receiver, a meter responding to the cathode current of said noise generator scaled in noise figures or figures of merit, a source of square wave voltage alternating at commonly encountered power line frequencies, an electronic switch controlled by said square wave alternating voltage and operating said noise generator on alternate periods of said square wave, a first amplifier, means for connecting the input of said first amplifier to the output of said radio frequency portion of said radio receiver, a second amplifier responsive to said first amplifier and having a gain which is attenuated three decibels as controlled by said square wave voltage source and at periods of said square wave corresponding to those operating said noise generator, a rectifier and filter responsive to said second amplifier to produce an output which contains substantially only modulation components produced by said square wave appearing in the output of said second amplifier, a third amplifier responsive to said rectifier to produce an output which depends on both the magnitude of the component of said square wave voltage appearing at the output of the preceding filter and the phase of said component with respect to a voltage introduced into said third amplifier from said square wave voltage source, a second rectifier which converts to direct voltage the output of said third amplifier, a variable electronic attenuator the resistance of which is controlled by the direct voltage output of said second rectifier, said variable electronic attenuator automatically controlling the bias and thus the noise power output of the aforementioned noise generator while said noise generator is operating, such control being the ultimate result of the ratio between the noise power output of said noise generator and the inherent noise power at the output of said radio frequency portion of a radio receiver, said ratio thereby appearing on said meter responding to cathode current of said noise generator because of the direct relationship between said ratio and said cathode current, causing said meter to read noise figure or figure of merit of the radio frequency portion of a radio receiver being measured.

5. An automatic device for measuring noise figure or figure of merit indicating performance of electronic apparatus comprising a noise generator, means for applying a signal from said generator to the input of said apparatus, a meter connected to indicate the output of said generator, an amplifier responsive to the output of said apparatus, a switch connected to control the operation of said generator, a second switch adapted to attenuate the output of said amplifier by a constant predetermined amount, means periodically actuating said first and second switches simultaneously to make said generator and said attenuator effective, and means responsive to the output signal level of said amplifier and the actuation of said switches to control the power output of said generator.

6. An automatic device for measuring noise figure or figure of merit indicating performance of electronic apparatus comprising, a generator of noise signals, means for amplifying the output of said apparatus, means to attenuate the output of said amplifying means by a constant fixed amount, means to apply noise signals from said generator to said apparatus, switching means for periodically making said generator and said attenuating means simultaneously effective, means for controlling the output of said generator in response to the output of said amplifier, and a meter connected to said generator to indicate the output amplitude thereof.

7. An automatic device for measuring the performance of electronic apparatus comprising, a noise generator, means for indicating the output of said generator, means applying the output of said generator to the input of said apparatus under test, a square wave voltage source, an electronic switch energized from said square wave source to make said generator operative on alternate periods of voltage of said square wave, means for amplifying the output of said apparatus, an electronic attenuator adapted to reduce the output of said amplifying means by a constant amount in response to a square wave voltage from said source during the period of said square wave when said noise generator is operative, a first rectifier responsive to the output of said attenuator, a phase sensitive electron tube biased by the square wave of said source and responsive to the amplitude and phase of the output of said rectifier with respect to the square wave voltage from said source to derive a direct current output voltage, and means for controlling the output of said noise generator from the output of said phase sensitive electron tube.

8. An automatic circuit for measuring the noise figure of electronic apparatus comprising, a noise generator, a square wave voltage source, an electronic switch for said generator and biased by said square wave source to make said generator alternately operative and inoperative, means applying the output of said noise generator to the input of said apparatus to be tested, means for amplifying the output of said apparatus, an electronic device responsive to the voltage of said square wave source to attenuate the output of said amplifying means during the time interval said noise generator is operative, means to rectify and filter the output of said device, an electron tube responsive to the amplitude and phase of the rectified and filtered output of said device and the phase of a reference voltage from said square wave voltage source to deriving a control voltage related to the output of said amplifying means, and means for applying said control voltage to bias said noise generator to control the output amplitude thereof.

9. An automatic device for measuring the noise figure of electronic apparatus comprising a noise generator, a square wave voltage source, an electronic switch tube for said generator and biased by said square wave source to make said generator alternately operative and inoperative, means applying the output of said noise generator to the input of said apparatus to be tested, means for amplifying the output of said apparatus, an electronic attenuator responsive to output of said amplifying means and having two electron tubes connected with parallel inputs and outputs, one of said electron tubes being biased by the output of said square wave source to be conducting during the time interval that said noise generator is inoperative and nonconducting during the time interval said noise generator is operative, whereby the output of said attenuator varies between two predetermined levels alternately with said square wave voltage, means to rectify and filter the output of said attenuator, a third electron tube responsive to the amplitude and phase of the rectified and filtered output of said attenuator and the phase of a reference voltage from said square wave voltage source to deriving a control voltage related to the output of said amplifying means, and means for applying said control voltage to bias said noise generator to control the output amplitude thereof.

10. An automatic device for measuring the noise figure or figure of merit indicating excellence of performance of electronic apparatus comprising, means for amplifying the output of said apparatus, a noise signal generator responsive to an input bias voltage to provide a controlled output amplitude, an attenuator, switching means for simultaneously applying the output of said noise generator to the input of said apparatus under test and connecting said attenuator to the output of said amplifying means to reduce the gain of said amplifying means by a constant amount, means for periodically actuating said switching means whereby the output of said amplifying means is related alternately to the noise output of said apparatus in the absence of an input signal and to the noise output of said apparatus in response to said noise signal from said generator, means responsive to the periodic actuation of said switching means and to the output of said amplifying means to derive a control voltage proportional to the inherent noise output of said apparatus, and means for biasing said noise generator in response to said control voltage.

11. An automatic device for measuring the noise figure or figure of merit indicating excellence of performance of electronic apparatus comprising, means for amplifying the output of said apparatus, a noise signal generator responsive to an input bias voltage to provide a controlled output amplitude, a first electronic switch tube for applying the output of said generator to the input of said apparatus under test, a second electronic switch tube for reducing the gain of said amplifying means by a constant amount, a square wave voltage source, means for periodically energizing said first and second electronic switch tubes whereby the output of said amplifying means is related alternately to the noise output of said apparatus in the absence of an input signal and to the noise output of said apparatus in response to said noise signal from said generator, means responsive to the square wave voltage from said source and to the output of said amplifying means to derive a control voltage proportional to the inherent noise output of said apparatus, and means for biasing said noise generator in response to said control voltage.

References Cited in the file of this patent

UNITED STATES PATENTS

| Number | Name | Date |
|---|---|---|
| 1,885,299 | Schramm | Nov. 1, 1932 |
| 2,035,176 | McLennan | Mar. 24, 1936 |
| 2,122,672 | Roberts | July 5, 1938 |
| 2,252,058 | Bond | Aug. 12, 1941 |